J. W. McKINSTRY.

Improvement in Grain-Separators.

No. 127,626. Patented June 4, 1872.

Witnesses.
C. F. Brown.
N. Ellsworth.

Inventor.
John W. McKinstry
By Hill & Ellsworth
His Attys.

UNITED STATES PATENT OFFICE.

JOHN W. McKINSTRY, OF COLUMBUS, WISCONSIN.

IMPROVEMENT IN GRAIN-SEPARATORS.

Specification forming part of Letters Patent No. 127,626, dated June 4, 1872.

*To all whom it may concern:*

Be it known that I, JOHN W. MCKINSTRY, of Columbus, in the county of Columbia and State of Wisconsin, have invented certain new and useful Improvements in Fanning - Machines; and I do hereby declare the following to be a full, clear, and exact description of the same, reference being had to the accompanying drawing, forming part of this specification, in which—

Figure 1:
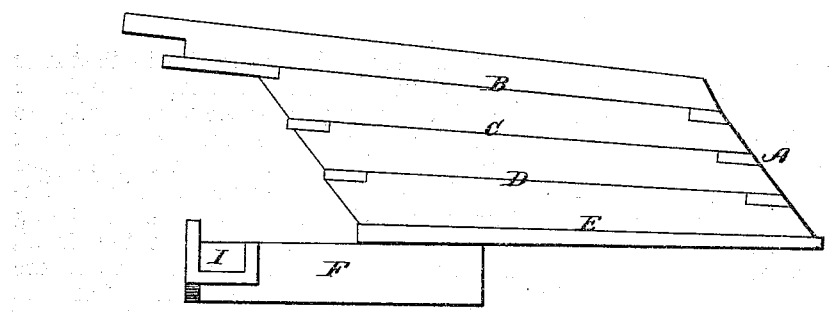
Figure 2:
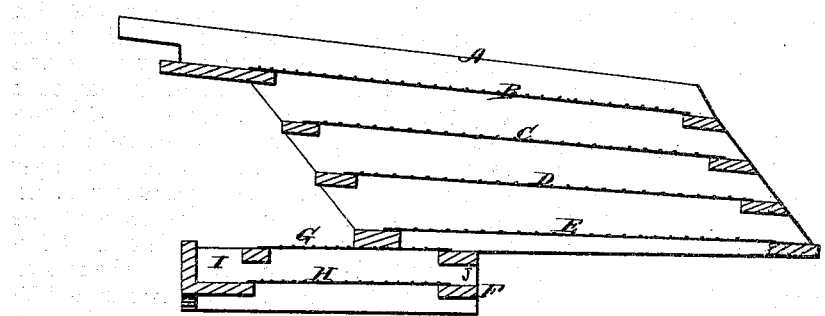
Figure 3:
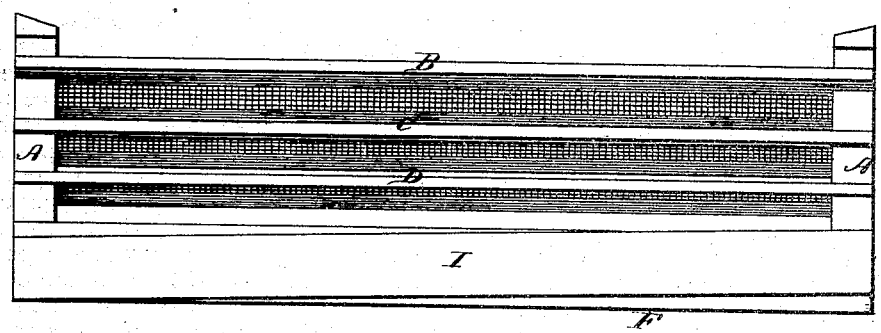

Figure 1 is a side elevation of a grader and gang of sieves constructed in accordance with my invention. Fig. 2 is a longitudinal section of the same, and Fig. 3 is a rear end elevation.

Similar letters of reference indicate corresponding parts in the several figures of the drawing.

My invention relates to that class of agricultural machines employed for cleaning grain, and has for its object to more completely separate wheat from oats and other foul matter, and to grade the wheat according to its market value. To this end the invention consists in a grader, constructed with a side spout and two sieves of different degrees of fineness, combined with a graduated gang of vibrating sieves, by being attached thereto at the front end of the lower sieve, and, consequently, adapted to vibrate with said gang. By this construction the grader receives and discharges the number one wheat completely free from oats, which are carried over the tail of the machine with the white-caps, the number two wheat passing down through the gang in the usual manner. The remaining wheat, together with the cockle, chess, broken wheat, and other foul matter, is discharged from the gang of sieves upon the upper sieve of the grader, and is there cleaned and separated, the foul matter passing into the chess-box through the under sieve, the smaller or number two wheat falling over its edge into the number two receptacle, while, if any number one wheat falls upon the grader with this matter it is conducted by the upper sieve into the side spout for the discharge of this grade.

In the accompanying drawing, A A are the the sides of the shoe, attached to the operating mechanism of the machine in the usual manner. B C D E are the sieves, secured between the sides, so that the front and rear ends of the series shall be inclined—that is to say, one sieve in advance of another—as shown in the drawing, the lower sieve extending to the right or tail of the machine in advance of the one next above it, and so on to the upper sieve. These sieves are constructed of different degrees of fineness, the upper one being the coarsest, and the lower one the finest, while the intermediate ones may be of the same grade, but differing, of course, from the upper and lower B E. The gradations of the sieves are about as follows: The upper sieves I prefer to make with four meshes to the lineal inch; the intermediate sieves with four and one-half to the inch, and the lower sieve with from four and three-quarters to five meshes to the inch. The grader is composed of a rectangular frame, F, provided with two sieves, G H, and a spout, I, placed at the front edge of the frame on a line with the lower sieve H. The grader thus constructed is attached to the under side of the shoe at the front end of the same, and extends a short distance beneath the lower sieve E. The grader vibrates with the shoe, and the two should be so connected that the former may be adjusted a greater or less distance under the sieve E.

The operation is as follows: The mill being set in motion, the wheat is discharged from the hopper directly upon the top sieve B. As the shoe and grader vibrate the larger and heavier or number one wheat falls directly through the coarse sieve, and from thence passes through the sieves C D—or over their front ends if the shoe is inclined toward the grader—directly upon the top sieve of said grader, which, being too fine for its passage, guides it into the spout I, by which it is discharged from the machine. The oats and white-caps are carried by the top sieve B over the tail of the machine, and discharged with the chaff and other light stuff. Inasmuch as the sieves in the gang are considerably shorter than those usually employed in fanning-mills, the oats and white-caps have a less distance to travel, and are therefore fed over before they can pass through to the sieve C. The unusual coarseness of the top sieve readily permits the passage of the wheat, but effectually excludes the oats and white-caps. As the shoe and grader continue to vibrate, the number two wheat passes directly through all the sieves, and is discharged from the lower one behind the grader into a suitable receptacle placed within or under the machine. The foul matter—such as cockle, chess, broken wheat, &c., which is not blown over the sieves, and with which is necessarily mixed a certain quantity of good wheat—falls through the sieves at the front end of the shoe directly upon the top sieve G of the grader, which readily permits its passage to the lower sieve, but separates such portion of the number one grade as may remain, and conducts it to the discharge-spout I. The lower sieve separates the remaining wheat from the foul matter, the latter falling through it into the chess-box, and the former passing over its rear end at J under the influence of the blast from the fan into the receptacle for the number two grade. By adjusting the grader a greater or less distance under the gang the quantity of wheat separated is increased or diminished.

Having thus described my invention, what I claim is—

1. The grader, consisting of the frame F, graduated sieves G H, spout I, and discharge-passage J, all constructed as described, for the purpose specified.

2. The grader, constructed as described, in combination with the vibrating-gang of graduated sieves, arranged to operate in the manner described, for the purpose specified.

JOHN W. McKINSTRY.

Witnesses:
 GERRY W. HAZELTON,
 H. C. WHITNEY.